(12) United States Patent
Hillier et al.

(10) Patent No.: US 11,032,420 B2
(45) Date of Patent: Jun. 8, 2021

(54) TELEPHONE CALL MANAGEMENT SYSTEM

(71) Applicant: INGENIUS SOFTWARE INC., Kanata (CA)

(72) Inventors: Peter M. Hillier, Kanata (CA); Richard J. Loen, Ottawa (CA)

(73) Assignee: Upland Software, Inc./Logiciels Upland Inc., Laval (CA)

( * ) Notice: Subject to any disclaimer, the term of this patent is extended or adjusted under 35 U.S.C. 154(b) by 122 days.

(21) Appl. No.: 16/273,238

(22) Filed: Feb. 12, 2019

(65) Prior Publication Data

US 2020/0169636 A1 May 28, 2020

Related U.S. Application Data

(60) Provisional application No. 62/770,856, filed on Nov. 23, 2018.

(51) Int. Cl.
| | |
|---|---|
| *G06F 15/16* | (2006.01) |
| *H04M 3/51* | (2006.01) |
| *H04M 3/56* | (2006.01) |
| *H04L 29/06* | (2006.01) |
| *H04L 12/58* | (2006.01) |

(52) U.S. Cl.
CPC .......... *H04M 3/5166* (2013.01); *H04L 51/02* (2013.01); *H04L 65/1096* (2013.01); *H04M 3/5183* (2013.01); *H04M 3/567* (2013.01)

(58) Field of Classification Search
CPC ... H04L 65/1096; H04L 51/02; H04M 3/5166
See application file for complete search history.

(56) References Cited

U.S. PATENT DOCUMENTS

| | | | |
|---|---|---|---|
| 6,732,142 B1* | 5/2004 | Bates ...................... | G10L 13/00 379/88.13 |
| 10,708,216 B1* | 7/2020 | Rao ......................... | H04L 51/02 |
| 2008/0082609 A1* | 4/2008 | O'Sullivan ............. | H04L 51/04 709/204 |
| 2015/0063556 A1* | 3/2015 | Uba ..................... | H04M 3/5175 379/265.05 |
| 2017/0337913 A1* | 11/2017 | Guegan .................. | G10H 1/361 |
| 2019/0037077 A1* | 1/2019 | Konig .................... | H04M 3/523 |

\* cited by examiner

*Primary Examiner* — Hua Fan
(74) *Attorney, Agent, or Firm* — Traverse Legal, Plc (57) ABSTRACT

A conventional call center includes a contact center (CC) and a customer relationship manager (CRM). The CC receives a communication and handles the initial voice communication tasks, which enables the CC to route the call to an appropriate agent. The CRM includes a data repository for the organization, including all the information relating to each client and their interactions with the organization. The CRM may also include an interface software for displaying the information from the data repository relevant to the caller on the agent's screen, and for enabling data entry and removal. To eliminate the need for the CC, an improved CRM system provides initial voice communication tasks with an automated chat session to establish call context, solve initial problems, and then route the call to a human agent, if necessary, based on information garnered.

18 Claims, 8 Drawing Sheets

Embedded HTML code in Chat

```
<select name="textName" size="5">
<option>textOne</option>
<option>textTwo</option>
<option>textThree</option>
<option>textFour</option>
<option>testFive</option>
</select>
```

OR

```
<input list="textName">
<datalist id="name">
<option value="textOne">
<option value="textTwo">
<option value="textThree">
<option value="TextFour">
<option value="TextFive">
</datalist>
```

THEN

```
<form action="/action_page.php">
Text string: <input type="text" name="name"><br>
<input type="submit" value="Submit">
</form>
```

InGenius HTML To Voice Engine

Please "select" from the following "5" "textName":

"textOne", "textTwo", "TextThree", "TextFour", "TextFive"

Please provide your "text string"

Figure 8

__Embedded HTML code in Chat stream__

```
<select name="Menu Items" size="5">
<option>Pizza</option>
<option>Poutine</option>
<option>Salads</option>
<option>Sandwiches</option>
<option>Wings</option>
</select>
```

InGenius HTML To Voice Engine

Please "select" from the following "5" "menu items":

"Pizza", "Poutine", "Salads", "Sandwiches", "Wings"

OR

Please "select" from the following "5" "menu items":

Press 1 for "Pizza"
Press 2 for "Poutine"
Press 3 for "Salads"
Press 4 for "Sandwiches"
Press 5 for "Wings"

```
<form action="/action_page.php">
Account Number: <input type="text" name="account"><br>
<input type="submit" value="Submit">
</form>
```

Please provide your "account number"

TELEPHONE CALL MANAGEMENT SYSTEM

CROSS-REFERENCE TO RELATED APPLICATIONS

This application claims priority from U.S. provisional patent application Ser. No. 62/770,856 filed Nov. 23, 2018.

TECHNICAL FIELD

The present invention relates to a telephone call management system, and in particular to an automated telephone call management system for use with a customer relationship management system to provide initial automated verbal interaction and call transfer functionality.

BACKGROUND

Conventionally, organizations 1 (FIG. 1) would utilize a telephone switching system 2 to direct an incoming voice call 3 on one of their incoming telephone lines 4 from a communication network 5 to an appropriate extension $6_1$ to $6_n$ in the organization 1. As technology has progressed, simple telephone switching systems have evolved into complex customer support center (Call Center) systems 10 providing a communication gateway between the public and the organization 1, and typically including two integrated providers: a Contact Center (CC) provider 11, and a Customer Relationship Management (CRM) provider 12.

Figure 1:
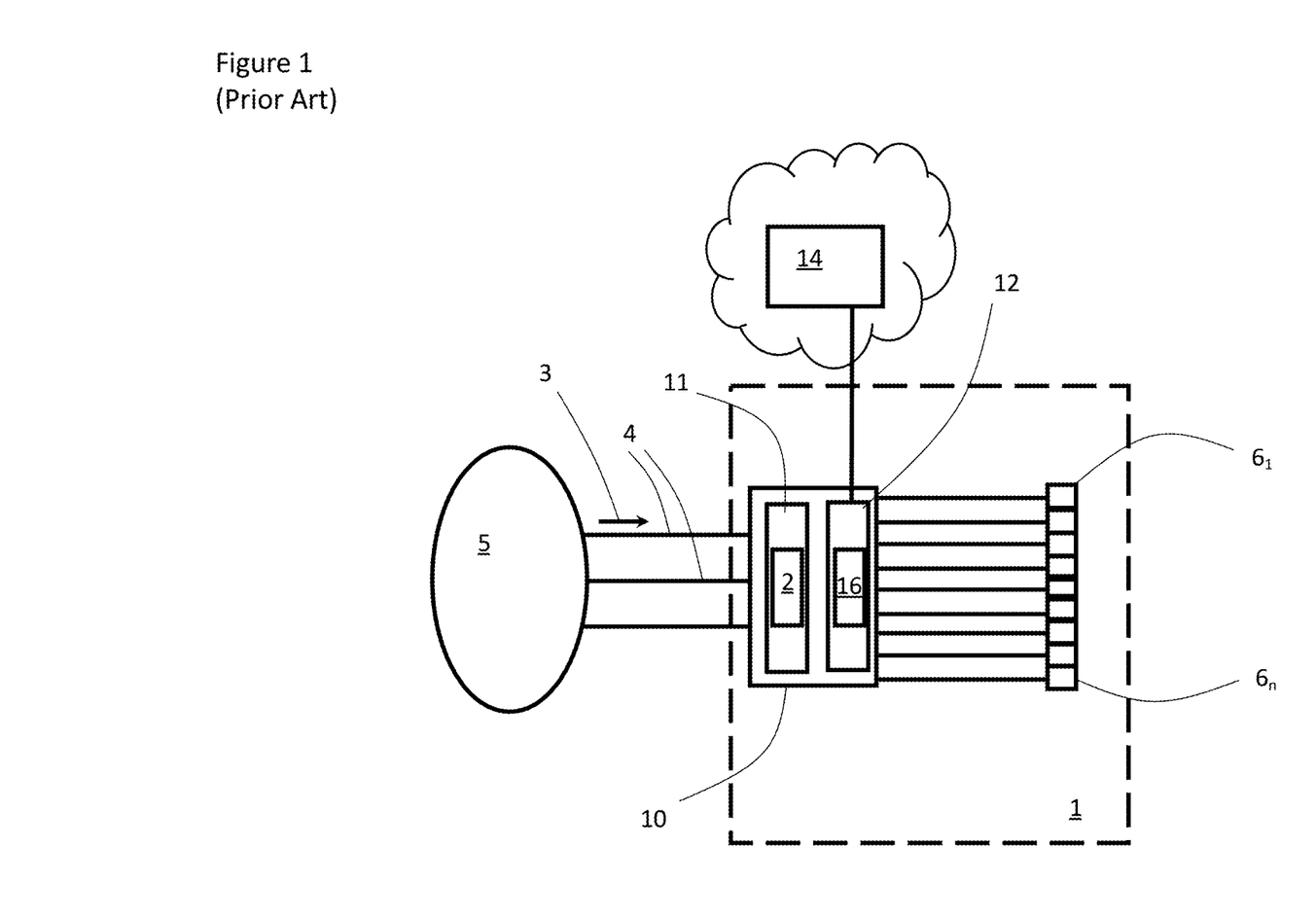
FIG. 1 is a schematic view of a conventional telephone network of an organization.

The CC provider 11 comprises complex hardware and software for receiving a communication via a communication channel, e.g. the telephone call 3 over the telephone line 4, and handles the initial voice communication tasks, including private branch exchange (PBX), integrated voice recognition (IVR), Call Recording, and Automated Call Distribution (ACD), which enables the CC provider 11 to collect caller information and then route the call to an appropriate agent $6_1$ to $6_n$, typically without the need for a human operator. The CC provider 11 may also handle other communication channels, such as Chat, Email, SMS, and social media, e.g. Twitter™, Facebook™ and Instagram™ from the network 5 or other communication networks.

The CRM provider 12 includes a data repository 14 for the organization, including all the information relating to each client and their interactions, e.g. sales and previous representative, with the organization. The data repository 14 may be saved in memory provided by the organization 1 or in remote memory depositories, e.g. the cloud, as is well known in the art. The CRM provider 12 may also include an interface software 16, e.g. Salesforce™, provided on the organizations computer network or remote location for displaying the information from the data repository 14 relevant to the initiator of the telephone call 3 on the agent's screen, and for enabling data entry and removal either automated or manually to the memory. In recent years this rich data has provided enhanced channel integrations for Chat, Email, SMS, and social media. The CRM provider 12 may also support routing work items, in the context of Cases, Leads, Opportunities, and other business elements that exist solely within the CRM provider 12.

As the industry evolves, the CRM provider 12 remains dependent on the CC provider 11 to deliver voice to the CRM 12, whereby CRM adaptors provide for voice channel integration, but can manage all other communication channels independently and often much more effectively. The CC provider 11 maintains the control of voice communications, due the required infrastructure and legacy complexities for routing real time voice communications.

Today, the CC provider 11 provides routing of most external communication channels, but lacks the CRM data to help drive routing decisions. There are methods to push and pull data from the CRM provider 12, but these introduce cost, complexity and security issues.

Both the CRM and the CC providers 11 and 12 are actively seeking to use data, AI, and automation to create bots that perform repetitive, mundane, and self-service oriented tasks, freeing up humans to handle more complex customer queries. Due to the lack of integration between the CRM and CC providers 11 and 12 the effort to streamline support services requires two separate investment streams, duplication of deployment and maintenance efforts, and a disparate customer experience.

Today it is possible to "blend" channels and take some from the CC provider 11 and some from the CRM provider 12 and deliver them to the same agent. Having two routing engines introduces race conditions, and high volumes of voice traffic can starve lower priority channels. The solution quickly becomes overly complex when steps are taken to try and mitigate these issues.

An object of the present invention is to overcome the shortcomings of the prior art by providing a system that enables a CRM provider system to provide initial voice communication tasks, such as IVR, with an automated chat session to establish call context, and then route the call to a human agent, if necessary, based on information garnered, without a conventional CC provider with IVR and ACD functions.

SUMMARY OF THE INVENTION

Accordingly, the present invention relates to a call management system for connecting a caller to one of a plurality of agents via a customer relationship management (CRM) system without a contact center provider automated call distribution (ACD) or integrated voice recognition (IVR), comprising:

a voice engine for receiving an audio call from the caller;

a chat engine capable of providing an automated chat bot for interacting with the caller to collect information and execute predefined tasks;

an orchestrator capable of converting text messages from the chat bot to audio messages for the caller, and capable of converting audio messages from the caller into text messages for the chat bot; and a work engine for connecting the audio call to a selected one of the agents;

wherein the orchestrator is also capable of transferring the caller to the selected agent, via the work engine, when interaction with the chat bot is completed.

Another aspect of the present invention relates to a method of connecting a caller to one of a plurality of agents via a customer relationship management (CRM) system without a contact center provider, comprising:

receiving an audio call from the caller via a voice engine;

providing an automated chat bot for interacting with the caller to collect information and execute predefined tasks via a chat engine;

converting text messages from the chat bot to audio messages for the caller;

converting audio messages from the caller into text messages for the chat bot;

connecting the audio call to a selected one of the agents; and transferring the caller to the selected agent when interaction with the chat bot is completed.

BRIEF DESCRIPTION OF THE DRAWINGS

The invention will be described in greater detail with reference to the accompanying drawings which represent preferred embodiments thereof, wherein.

DETAILED DESCRIPTION

While the present teachings are described in conjunction with various embodiments and examples, it is not intended that the present teachings be limited to such embodiments. On the contrary, the present teachings encompass various alternatives and equivalents, as will be appreciated by those of skill in the art.

The present invention includes a system and method that enables IVR tasks to be completed by a Chat Bot using a combination of Speech to Text and Text to Speech to facilitate information exchange. Similar to a chat session, if the Chat Bot is unable to complete the task, or is requested by the customer, the session may be transferred to a human agent. The system may use the CRM provider to route the call, eliminating the need for a separate ACD solution.

Figure 2:
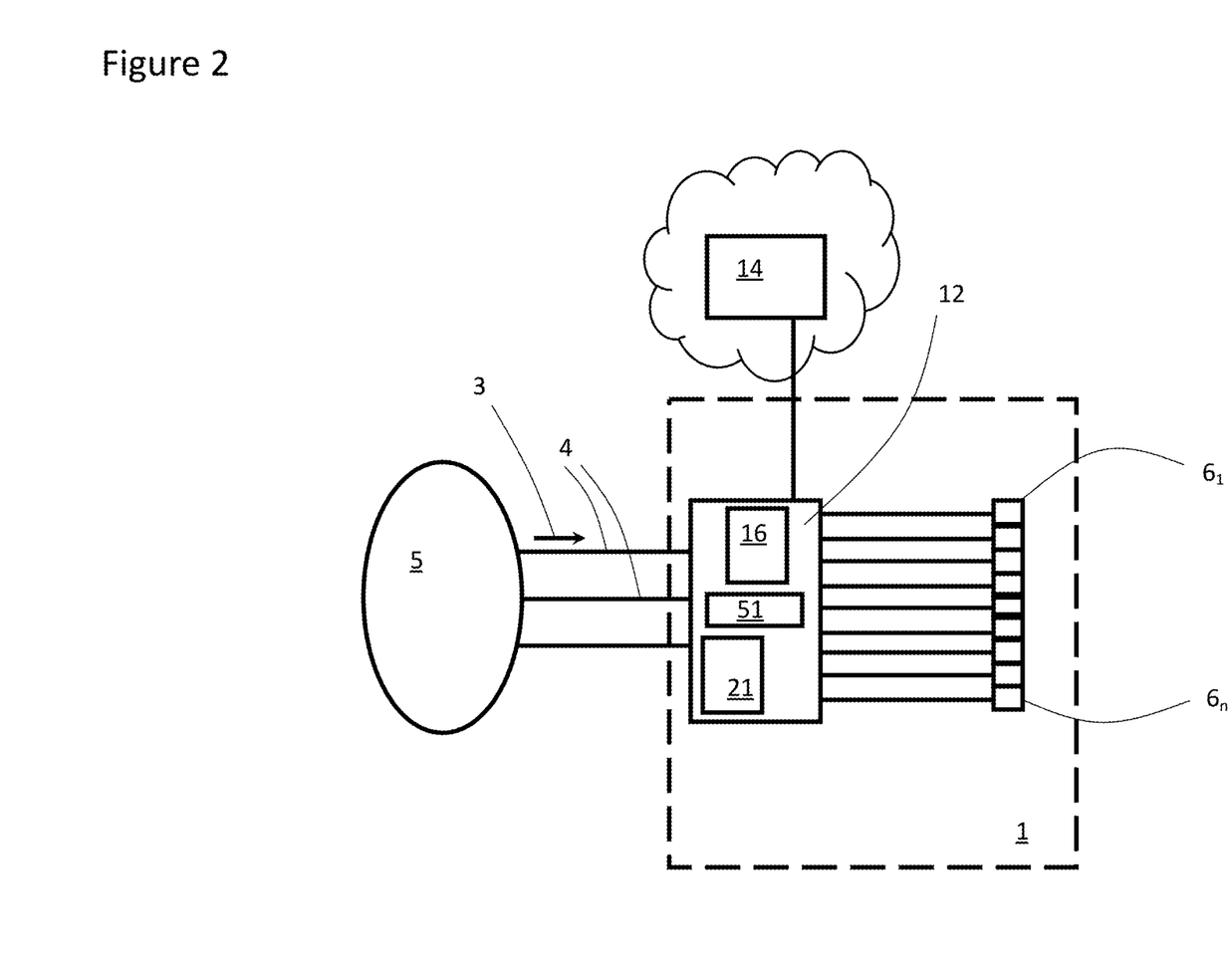
FIG. 2 is a schematic view of a telephone network of an organization in accordance with an embodiment of the present invention.
Figure 3:
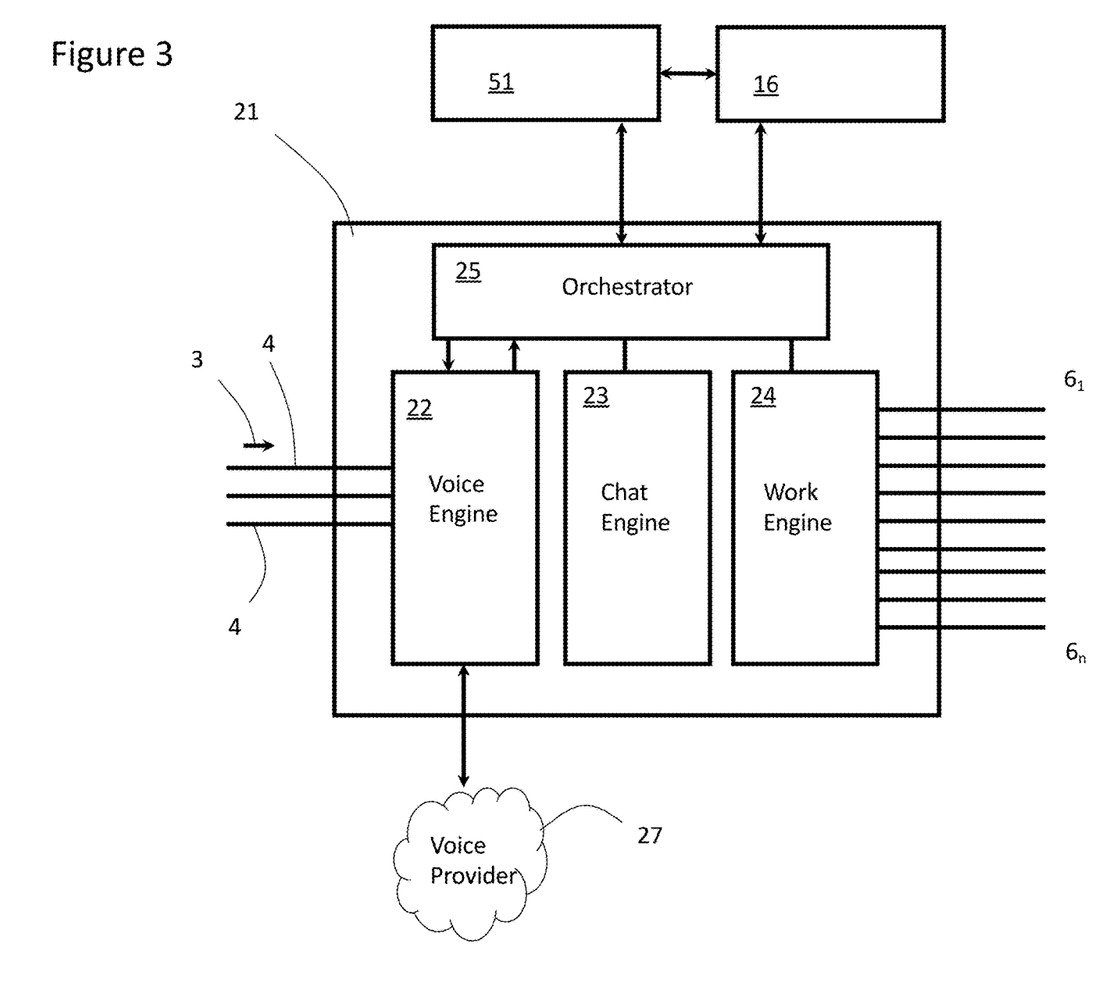
FIG. 3 is a schematic view of a telephone management system in accordance with an embodiment of the present invention.

With reference to FIGS. 2 and 3, a telephone management system 21 of the present invention is comprised of a plurality of functional components, including a Voice Engine 22, a Chat Engine 23, a Work (routing) Engine 24, and an Orchestrator 25, used in combination with the CRM provider 12 as part of the communication system of the organization 1. Each component 22-25 may be comprised of a combination of hardware and/or software stored in memory and executable by a processor on the hardware. The hardware and software may be stored on the premises of the organization 1 or in a remote location. In a preferred embodiment, the system 21 provides reception and direction for a customer's telephone call 3 from the communication network 5 calling into an organization's support line 4. The organization 1 has deployed the system 21 for effectively connecting their support line 4 with an automated Chat Bot in the Chat Engine 23 to enable reuse of existing chat self-service features, or to collect information about the user prior to transferring the call 3 to the appropriate human agent $6_1$ to $6_n$. The call 3 may be any form of audio session not just a standard POTS, ISDN, cellular or VOIP call, e.g. originate from Amazon Alexa™, Google Home™, or other voice activated service. For example, an Amazon skill may be created that will map "Ask InGenius for help" that would initiate an audio connection from Alexa to the Voice Engine 24, e.g. Twilio™, etc.

With reference to FIG. 3, the Voice Engine 22 provides public switched telephone network (PSTN) connectivity, such that an individual can dial a number and connect to the service. The Voice Engine 22 may also connect to any cloud voice provider 27, such as Twilio™, or a premise voice provider, such as Cisco™, Avaya™, and Genesys™.

The Chat Engine 23 provides the ability to host a Chat Bot 41 (see FIG. 4) that may interact with an end user using any one or more of chat, SMS, or other social media messaging platform. The Chat Bot service is designed to collect user information to query data and respond in turn with business information. For example, Salesforce Live Agent™ with Einstein Bot™ technology. Basic tasks may include resetting a password after verifying a user, or providing updates on an open issue. The chat bots 41 may be designed to transfer chats to a human agent $6_1$ to $6_n$ upon demand, or once the chat bots 41 detects that they cannot service the user's request. In practice any external data source can be queried, but in the preferred embodiment, a CRM 12, including Salesforce software 16 for accessing the data repository 14, is used.

The Work Engine 24 is responsible for routing work items, e.g. communication links such as telephone calls, to agents $6_1$ to $6_n$, e.g. Salesforce™ agents. The CRM provider 12 is capable of queuing the work items, and delivering the work items to agents $6_1$ to $6_n$ either based on information gleaned by the chat bot 41 or simply when the next agent $6_1$ to $6_n$ is available. A work item is a general industry term used to denote an object, e.g. call, chat, sms, case, lead, that may be assigned to an agent $6_1$ to $6_n$. The assignment intones some form of work will be executed by the agent $6_1$ to $6_n$ on the object.

The Orchestrator 25 is responsible for managing the session between the Voice engine 22 and the Chat engine 23, effectively bridging the caller 40 with the chat bot 41. Text to speech (TTS) and speech to text (STT) are used to convert the incompatible communication mediums to enable a conversation between the caller and the system 21. The Orchestrator 25 also abstracts the nonrealtime nature of chat to pace information to the caller 40, and collect responses in turn to mimic a real conversation. As chat can often contain embedded HTML to present menus, options, lists and other forms of soliciting input, the Orchestrator 25 may be capable of translating the web language into verbal requests enabling the chat bot 41 to forward them to the caller 40.

It should be noted that the preferred embodiment assumes connecting to a Chat Bot 41; however, the system 21 works equally well connecting with a human chat agent. The difference is in the caller experience, where the conversation flow is delayed by the human typing on the chat side of the session.

Figure 4:
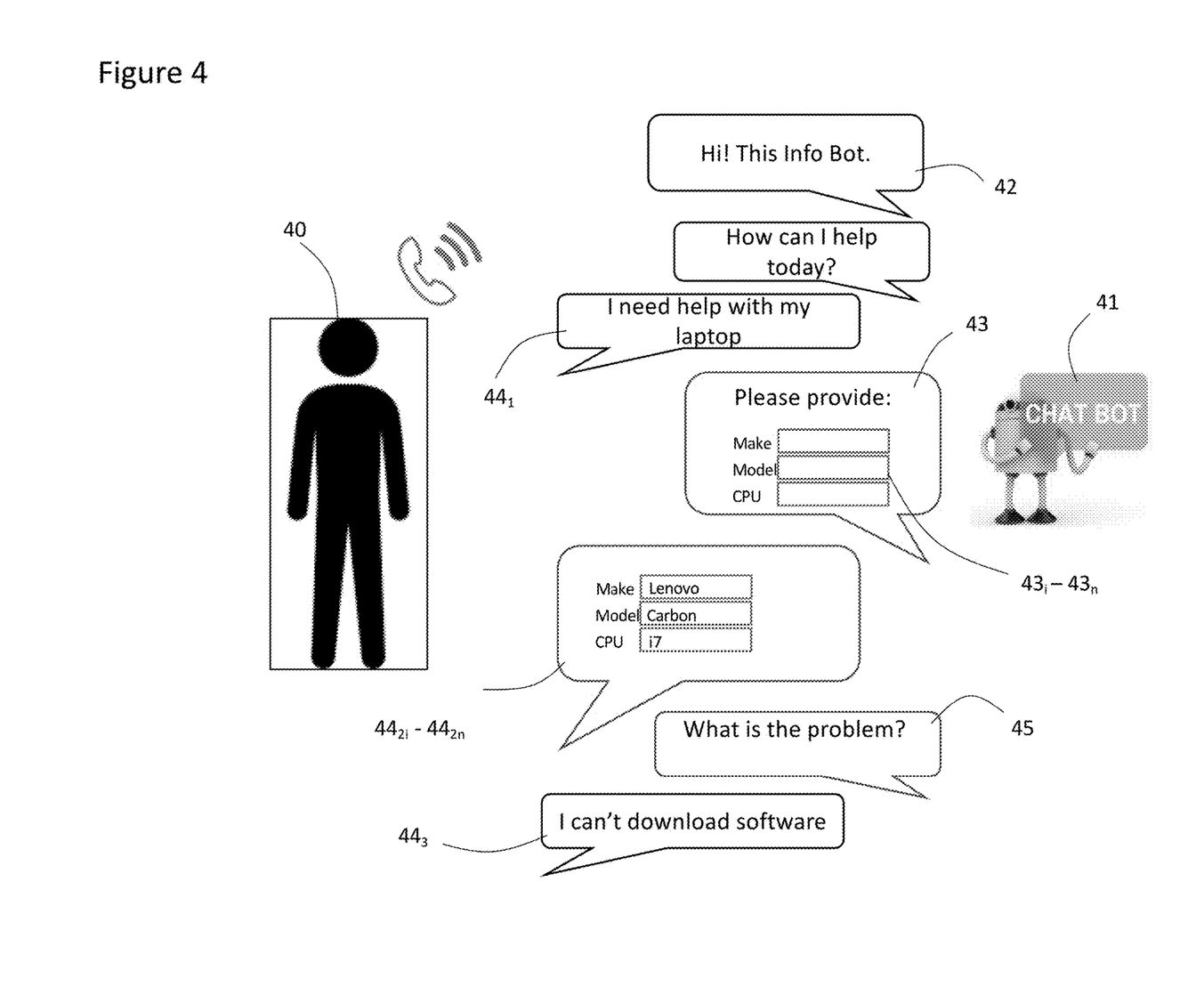
FIG. 4 is a schematic representation of an interaction between a user and the telephone management system of FIG. 3.
Figure 5:
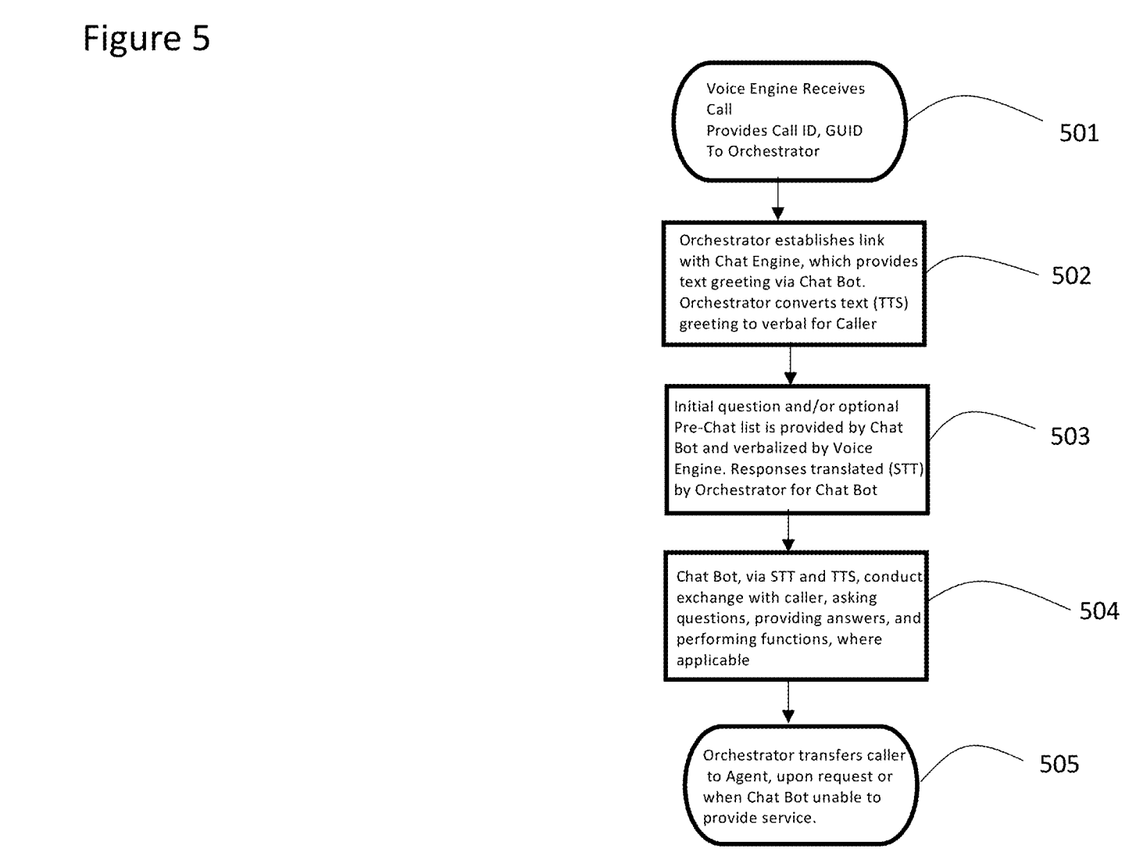
FIG. 5 is a flow chart representation of an interaction between a user and the telephone management system of FIG. 3.
Figure 6:
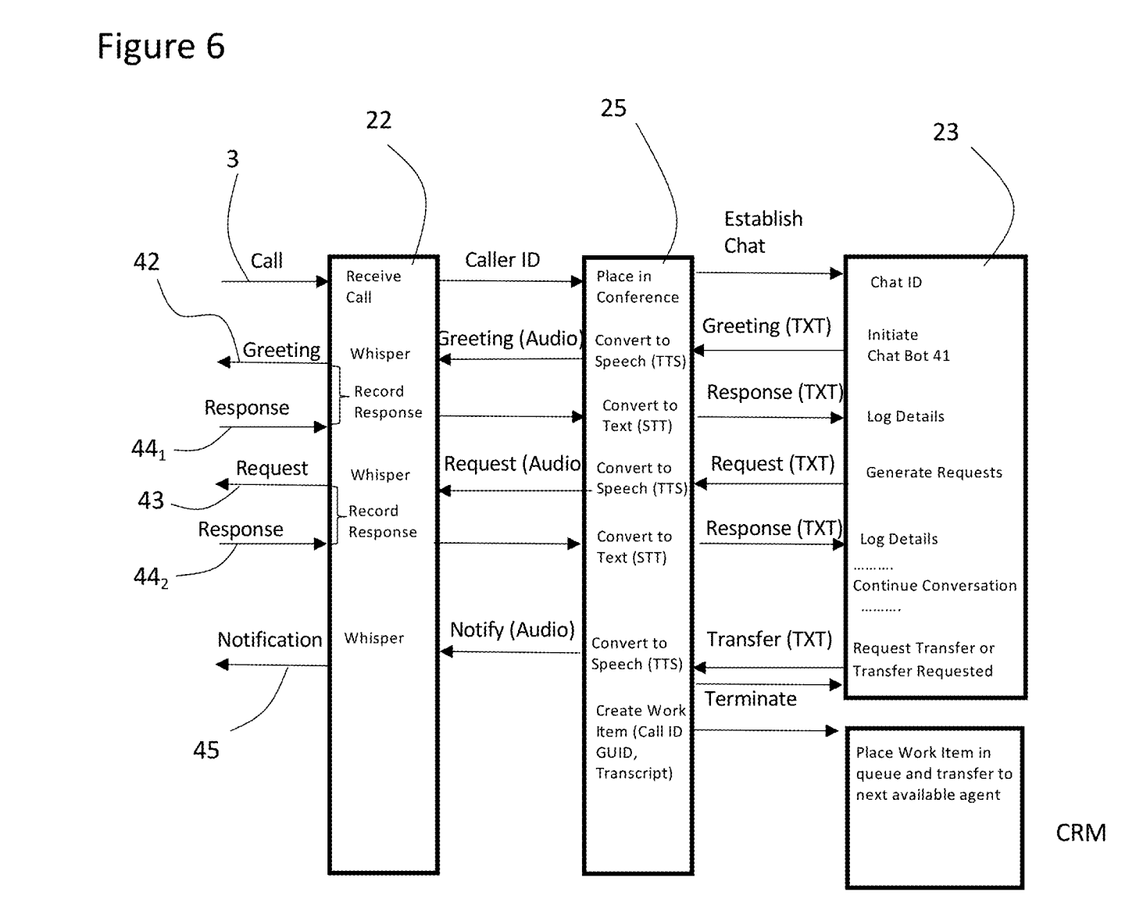
FIG. 6 is a representation of an interaction between a user and the telephone management system of FIG. 3.

With reference to FIGS. 4, 5 and 6, on an incoming call 3, the voice engine 22 receives the call 3 and notifies the Orchestrator 25 with a signal that a caller 40 wishes to connect to the customer service solution of the organization 1 (Step 501, FIG. 5). The Orchestrator 25 optionally uses a canned response message via the voice engine 22 to notify the caller 40 to please wait while a connection to a voice bot 41 from the Chat Engine 23 is made (Step 502). This may or may not be required depending on the time it takes to connect, e.g. bots respond immediately, humans may take some time. Additionally, legal requirements may require notification to the caller 40 that they are being connected to a non-human, whereby the Orchestrator 25 may instruct the voice engine 22 to provide such a message to the caller 40. Along with the call notification, the Voice Engine 22 may provide a globally unique identifier (GUID) for the call as well as any call information, such as caller-id (name, number), dialed number, to the Orchestrator 25.

The Voice Engine platforms 22 typically require calls to be connected between two stations, or users. Otherwise the call is considered disconnected and is terminated. To maintain the connected state, several options exist.

The Orchestrator 25 may create a station endpoint to mimic an answer point for each inbound call 3. While certainly possible, this adds significant overhead in terms of performance, scalability, and potential licensing costs depending on the voice provider. In this manner the orchestrator 25 may uses hold and retrieve to connect/pause the voice path.

Alternatively, the Orchestrator 25 may mimic a single station endpoint for all callers and use Voice Engine features like Call Park™ and Call Pickup™ to juggle between calls. When the Orchestrator 25 needs to relay a message from the chat bot 41, it "picks up" the call using the applicable code that was provided when the call was parked, plays the audio, then parks it again. Because the voice is played in real time, a single station endpoint model can cause the system to stall and other callers do not get serviced.

The single station approach introduces blocking and renders the real-time performance of the system difficult. The multiple station approach is undesirable due to cost and complexity. A preferred embodiment of the present invention proposes combining two well-known telephony concepts, conferencing and announcements, to provide the preferred solution.

In one embodiment, as a call 3 comes in from the Voice Engine 22 the Orchestrator 25 instructs the Voice Engine 22 to places the call 3 into a conference of one participant. The conference function may be provided by the provider of the network 5 or by the Voice Engine 22. The conference is created with music disabled to avoid the perception that the call 3 is being held. While conference announcements are typically used to announce new comers to the conference, the Orchestrator 25 uses this to relay instructions or requests from the Chat Engine 23.

In the preferred embodiment ALL callers are placed into the same conference and each are placed on mute, with no ability to unmute, which is commonly referred to as a broadcast conference and resembles a uni-directional webcast. The mute feature prevents the various callers from communicating with each other. A telephony feature known as Whisper Coach™ may then be used to play audio to a single attendee in the conference, without others over hearing. When the time comes to record responses, however, the Orchestrator 25 must instruct the Voice Engine 22 to move the call 3 to a recording point to capture the response, and then place the caller back into the conference on mute. For example, when using a cloud service, such as Twilio™, the Orchestrator 25 or the Voice Engine 22 execute one or more API calls to begin and end the recording.

One issue that may occur when intermittently enabling and disabling recording to capture caller responses is that the first few words of the caller response may be missed, because conventionally the recording function is not activated until the Chat Bot 41 reaches the end of the message, for which the caller 40 may not always wait. However, leaving the call recording function on constantly is costly in terms of system resources. Truncated responses may cause the Chat Bot 41 to misinterpret the reply, and trigger an early transfer to a human agent $6_1$ to $6_n$, thereby defeating the purpose of the solution to minimize the involvement of human agents $6_1$ to $6_n$.

To prevent misinterpretations the Orchestrator 25 may detect, via text parsing, when the Chat Bot 41 is requesting information from a user 40, e.g. when the text contains a question mark or HTML containing options for user selection, which the Orchestrator 25 must translate to voice, as hereinafter discussed. Other keys words and phrases, e.g. interrogatory words such as "how", "can" and "please provide", may also activate the recording logic even before the caller starts to respond. The Orchestrator 25, upon detection of a pending question, moves the call to a recording point or activates conference recording, plays the audio from the chat, and then captures the full caller response. The Orchestrator 25 then uses STT to translate the response, and the original text from the chat side can be filtered out of the response.

In one embodiment, the single participant conference is constantly being recorded by the Orchestrator 25, and timestamps are used to filter responses without losing parts of the caller response. In this method, a first timestamp is taken when the chat audio question is played. Upon detecting the end of the caller response, e.g. silence for a predetermined number or seconds, a second timestamp is taken, minus the silence detection period. The recording is then translated from the first timestamp to the second timestamp, with the chat text again filtered out. In one embodiment the first timestamp may be taken after the chat audio question is played, although the time difference between the end of the chat audio question and the start of the caller response can be small, or even negative if the caller 40 begins answering the question before the question is finished being asked.

In the scenario where the multi-party conference is used, when the Orchestrator 25 detects that input is required from the caller 40, the caller 40 is moved to the recording point, e.g. using an API (application program interface) call to a cloud service, such as Twilio™, and a recording is started, and the chat audio is played. Aforementioned methods are used to filter the chat text from the caller response. Note that the recording point could be a single party conference that is initiated once the Orchestrator 25 detects input is required.

Upon initial detection of the incoming call 3 from the Voice Engine 22, the Orchestrator 25 may programmatically initiate a chat to the Chat Engine 23 in a fashion very similar to how one would engage via a web site, except without a UI in place (headless). This may require credentials to identify the Orchestrator 25 as the instigator of the session. Upon authentication the chat session is established, and the Chat Engine 23 responds with its own GUID to uniquely identify the session. Chat bots 41 may be fronted by a website that prompts visitors to engage in a chat session. According to an embodiment of the present invention, the caller 40 is not visiting a web site—they are calling in on the phone. Accordingly, the Orchestrator 25 needs to activate the chat session in the same manner as if a web visitor selected the "Chat now" button. The back end chat technology does not distinguish between a web based chat session, or the Orchestrator 25 acting on behalf of a voice caller. This approach enables full reuse of the chat infrastructure and investments. The authentication of the credentials may occur with the chat infrastructure, e.g. via Salesforce 16, in order to interact with the chat API needed to authenticate with Salesforce so the application is "trusted".

The Orchestrator 25 stores the Call GUID, which came with the incoming call notification from the Voice Engine 22, and the Chat GUID from the Chat Engine 23 as a session object in a database indexed for use with either GUID, which enables fast lookup for voice to chat, or chat to voice, session information. Other information that accompanied the call, e.g. caller id and geographic location from the Voice Engine 22, other chat information, e.g. user data collected and chat transcript, and other session information, e.g. duration, from the Chat Engine 23 or the Orchestrator 25 may also be contained in the database object.

With reference to FIGS. 4, 5 and 6, upon connection of the caller 40 with any Chat Bot 41 from the Chat Engine 23 a greeting 42 is customary to provide additional confirmation that the session has started. The greeting 42 may take the form of welcoming the user and asking how the Chat Bot 41 can be of assistance. The greeting 42, in text form, is received by the Orchestrator 25 from the Chat Engine 23, and text to speech is used to convert the chat message 42 to voice, which in turn is played into the voice channel by the Voice Engine 22 for the caller 40 (Step 503, FIG. 5).

As noted earlier, part of the role of the Orchestrator 25 is to detect whether the Chat Bot 41 is making a statement, e.g. "Please wait while I retrieve your information", or requesting information, e.g. "What is your account number?". The Orchestrator 25 parses the text from the Chat Bot 41 looking for words or characters that identify a question, which can include a question mark, the words "how", "what", "provide", or an HTML form containing options. The initial stage of the chat may include the Chat Engine 23 providing a pre-chat form 43, including a plurality of questions $43_1$-$43_n$, e.g. details of caller or caller's item in question, that must be asked by the Chat Bot 41 one at a time and answered by the caller 40 with a corresponding response $44_{2i}$ to $44_{2n}$ prior to proceeding to the next question $43_1$ to $43_n$.

Upon detecting any request for information, the Orchestrator 25 needs to prepare the Voice Engine 22 to capture the caller responses $44_1$ to $44_n$, which is explained hereinafter.

The responses $44_1$ to $44_n$ from the caller 40 to the information requests 42, 43 and 45 is translated from voice to text, and the Orchestrator 25 either sends the text directly to the Chat Bot 41, or, if a form or HTML menu was presented, simulates the menu selection or data entry into the form programmatically and initiates the response.

In cases where multiple pieces of information are required the Orchestrator 25 is responsible for breaking the multi part request into individual verbal questions and serializing them into the Voice Engine 22 one at a time, and then collecting each response $44_1$ to $44_n$ in between. Once all responses $44_1$ to $44_n$ are received the text is placed into the expected response format by the Orchestrator 25 and returned to the chat session in chat engine 23.

In one embodiment, the pre-chat form 43, with a plurality of questions $43_1$ to $43_n$, must be completed prior to initiating a formal chat with the Chat Bot 41. While this is not required with all chat bots, which may automate this step, the Orchestrator 25 may consider the pre-chat form 43 a requirement. The Orchestrator 25 may query the CRM provider 12 for the specific chat session it is configured to connect to from a library of chat sessions stored in memory, based on details of the caller 40 or details of the caller's answer to the initial greeting and inquiry 42 and 43. Using an application program interface (API) from the CRM provider 12, such as those provided by Salesforce Live Agent™, the Orchestrator 25 may programmatically determine the pre-chat requirements and translates these into query text for translation to speech. Using methods already defined, these are fed to the caller 40 one by one. When the plurality of responses $44_{2i}$ to $44_{2n}$ are fully collected, the Orchestrator 25 completes the pre-chat form 43, then attempts to establish the chat session with the Chat Bot 41 from the Chat Engine 23, and passes the pre-chat form 43 to the Chat Engine 23 as part of the chat initiation requirements (Step 504, FIG. 5).

While text from a Chat Bot 41 may easily be translated to speech, HTML menus, buttons, and URL links cannot. The Orchestrator 25 provides an HTML to voice translation model to address common chat bot prompts and responses. Details of how the Orchestrator 25 may parse an HTML chat request for information into voice is provided below, and with reference to FIGS. 7 and 8.

Figure 7:
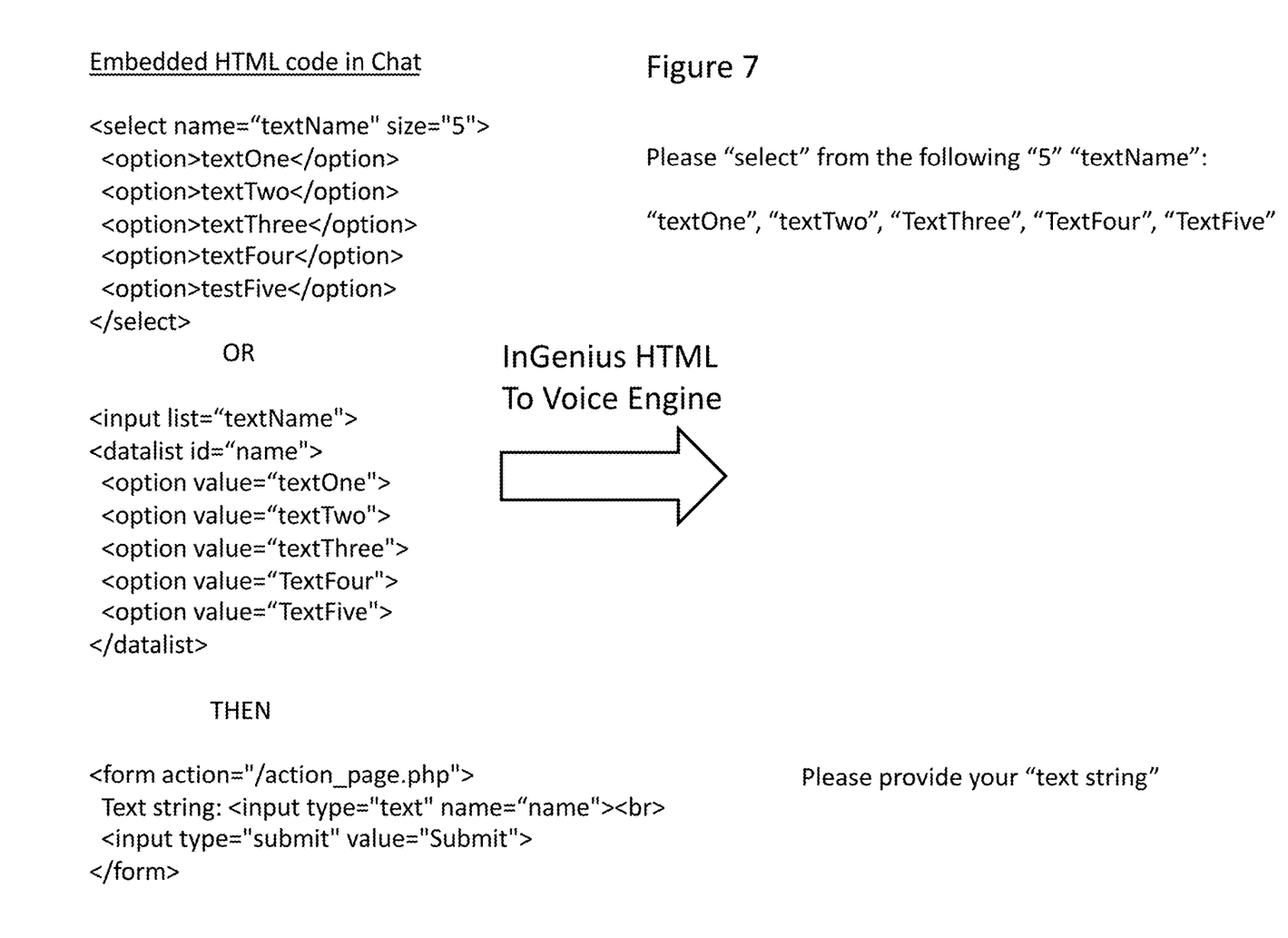
FIG. 7 is a representation of an example translation of HTML to speech in accordance with the telephone management system of FIG. 3.
Figure 8:
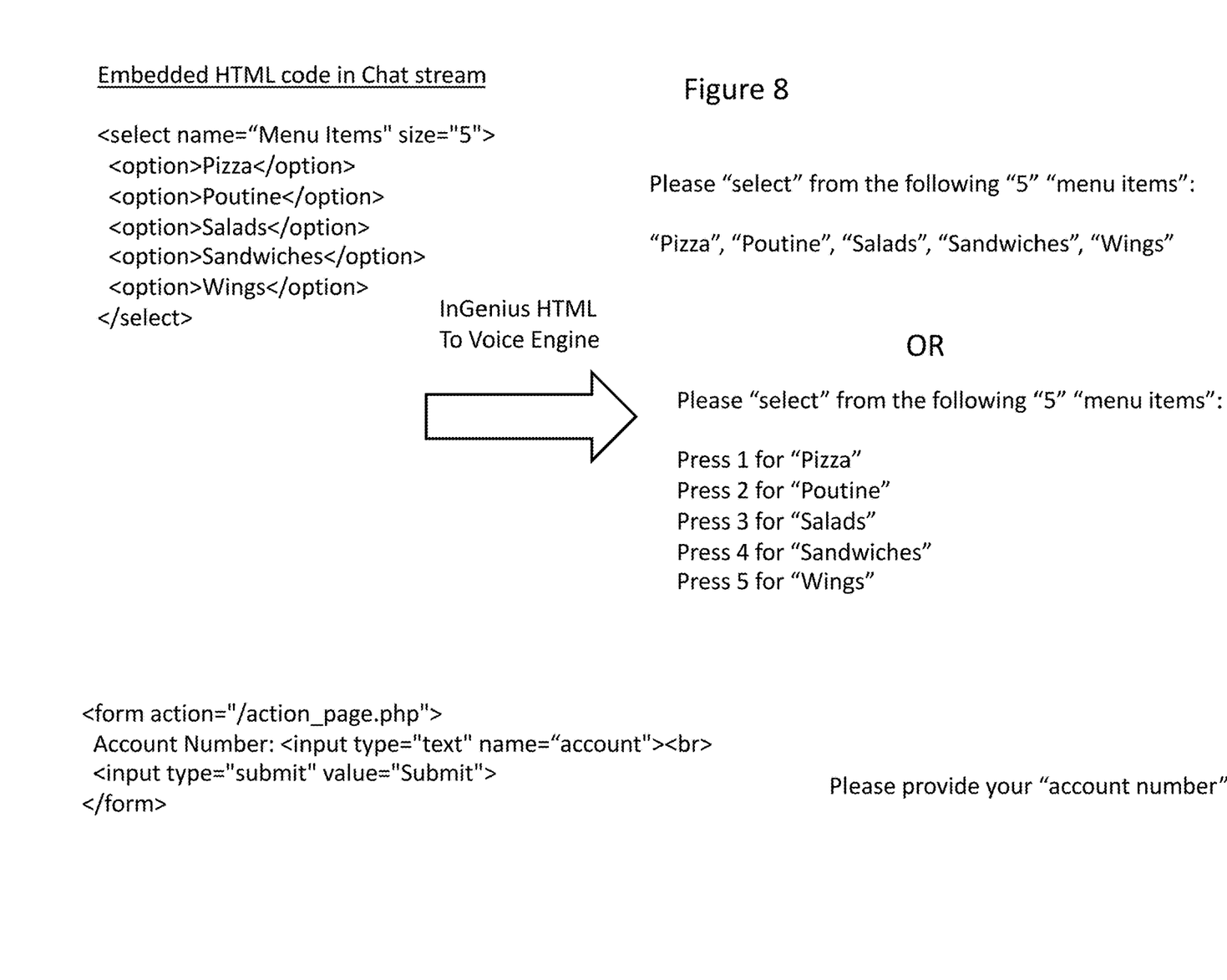
FIG. 8 is a representation of an example translation of HTML to speech in accordance with an embodiment of the telephone management system of FIG. 3.

1. Detect embedded HTML in chat stream; the text comes from the chat bot to the chat session, and the message is parsed to look for embedded HTML tags.

2. Parse HTML looking for supported objects by finding key words (SELECT, DROPDOWN, LIST, INPUT)

If unrecognized content found, trigger fault to cause transfer to voice agent $6_i$ to $6_n$ 3. Parse the "name" of the object, and count if available 4. Parse the sub objects, such as "options", to obtain one or more nouns 5. Translate the object name into a verb, for example:
  i) SELECT="select"
  ii) OPTION="select"
  iii) INPUT TYPE="provide"

6. Translate the "size" item, if applicable, to a number

7. Formulate the text to speech phrase by combining the verb and nouns into a sentence, for example:
  i) For Select or Option: Please "verb" from the following "number" options: noun, noun, noun . . . .
  ii) For Input: Please "verb" your "noun"

8. When multiple objects are detected, such as with a pre chat form 43, formulate each phrase separately and pass to the voice engine 22 one at a time, awaiting a response to each information request before proceeding.

9. Collect all responses $44_i$-$44_n$ from the voice engine 22 and fill in the form 43 to submit back to the chat engine 23.

Overrides—the system 21 will store the phrases that are formulated from step 7. The translation of the HTML form may not be accurate given the conversion from "code" to English. Therefore the system 21 will store the phrases over time in suitable memory, all requests from the Chat Bot 41 will be learned and stored in memory. This can be reviewed and edited for correctness. When an override exists, the formulated phrase from step 7 will be replaced with the "edited" or "corrected" version for translation to speech.

The Orchestrator 25 may be the first to detect a breakdown in communication, e.g. either the caller 40 will request to speak with an operator, e.g. the next available one of the agents $6_1$ to $6_n$, or the Chat Bot 41 will respond that it does not understand the caller's response.

The Orchestrator 25 must instruct the Voice Engine 22 to prepare the call 3 to be connected to one of the human agents $6_1$ to $6_n$. The communication may include a message to the caller 40 advising them to please hold. At this time 'music on hold' may be played, as the natural flow of the conversation is expected to pause. The Orchestrator 25 then terminates the chat session with the Chat Engine 23. If the decision to move the call to an agent $6_1$ to $6_n$ was made by the caller 40, or the Orchestrator 25 detected a problem, an appropriate final message is injected into the chat such that the chat transcript will contain the information on why the chat was terminated.

Many CRMs 12 support the notion of custom object. Since the concept of routing voice through a CRM provider 12 is new, a custom object is required that may contain all information related to the cross communication technology session, including the Call GUID, the Chat GUID, and the Chat Transcript.

In the case where the Chat Engine 23 is contained within the CRM provider 12, the Chat Transcript will already be recorded, so a simple reference can be passed, rather than the full transcript.

Some Chat Bots 41 already have the ability to create CRM work items. If this is the case, the Chat Bot 41 may be augmented to create a custom object to represent the voice call, which implies the Call GUID and other desired call information must be passed to the Chat Bot 41 as part of the notification that the caller 40 has requested to speak with a human. If the Chat Bot 41 does not have this ability, or there is a desire to prevent changes to the existing Chat Bot 41, the Orchestrator 25 may use the programmable interfaces available on CRMs to create the custom voice object instead.

Regardless of whether the Chat Bot 41 or the Orchestrator 25 creates the work item, custom logic is required to guarantee that the collected caller information, e.g. name, account number, and other data, is associated with the new work item.

At this point the Chat Bot 41 has fulfilled its role as a replacement for an integrated voice recognition (IVR) feature in the CC provider 11. All required caller details have been collected and stored for further use.

The automated call distribution (ACD) function previously performed by the CC provider 11 may also be replaced by functionality provided by the CRM provider 12. As mentioned previously, the CRM provider 12 understands the notion of a work item, e.g. call 3, and queues, and agents $6_1$ to $6_n$ associated with the queues.

The CRM provider 12, namely the interface software 16, may be configured to place a custom work item, representing an external voice object outside the CRM realm, into an internal work queue. The queues are typically meant for nonrealtime work routing, such as Cases or Emails. The queue associated with the voice work item may be set to the highest priority to reduce response times. The next available agent $6_1$ to $6_n$ associated with the queue should receive the work item (Step 505 FIG. 5). In CRMs 12 that support skill-based routing, the Orchestrator 25 or the Chat Bot 41 may attach skills to the work item during creation. These skills are detected from the session, including Language, Geographic location, time spent in chat (QoS, SLA), etc.

In some configurations the CRM provider 12 may rely on an external work engine to route work items to agents, such as Cisco Task Router, Avaya Adjunct Routing, or Genesys Universal Routing.

Regardless of the routing method, and regardless of the work item priority, eventually the voice work item will be directed to an available agent $6_1$ to $6_n$. Most CRM providers 12 support the notion of "popping" the work item on the desktop display of the agent $6_1$ to $6_n$ once they accept the task. The system 21 may be designed such that the agent $6_1$ to $6_n$, will be able to see the chat exchange 42-45 with the caller 40, so they may establish some form of context. Preferably, the additionally embedded data may be acted upon. For example, if any one or more of the caller account number, previous case number, or other data available within the CRM data base 14 are available, these records may also be retrieved from the data base 14 by the interface software 16 and presented in a logical manner to the display of the agent $6_1$ to $6_n$. How multiple data is rendered in the CRM provider 12 is beyond scope. InGenius Connector Enterprise™ is one example of an integrated agent desktop application 51 that has the ability to customize how CRM work items are managed and presented. For the preferred embodiment it is assumed an agent application 51, such as InGenius Connector Enterprise, has been customized to recognize this special voice work item and take additional steps to retrieve the multi-part information related to the voice call, e.g. call GUID, chat session, and caller information collected from the chat session and forward the information to the display terminal of the selected agent $6_1$ to $6_n$.

In the event the Chat Bot 41 is not capable of being modified to construct voice work items, there is a risk that the underlying bot may attempt, at some point, to transfer the session to a human chat agent $6_1$ to $6_n$. When this occurs the programmatic chat interface maintained by the Orchestrator 25 is notified a transfer is occurring as part of the protocol. If this cannot be overridden programmatically, the Orchestrator 25 may disconnect the chat side of the session to prevent connecting the caller to a human chat agent $6_1$ to $6_n$, and then create the voice work item. If connecting voice to chat agents is desirable, the Orchestrator 25 may keep the session alive. Typed responses from the agent $6_1$ to $6_n$ will cause delays over the immediate responses typically provided by the Chat Bot 41. While not the preferred embodiment, chat messages from one of the human agents $6_1$ to $6_n$ can equally be translated to voice for the caller 40. However, the escalation path to voice would then most likely be desired from the caller 40 directly to the chat agent, and not routed via a work item to another agent.

At this point, a caller 40 is now connected to the Voice Engine 22 listening to music on hold or conference, or some other source, while the work item is transiting the Work Engine 24 and pending delivery to an agent $6_1$ to $6_n$.

Rather than music on hold, the Orchestrator 25 may activate its own Entertainment Bot, which is designed to engage in idle banter with customers waiting to connect with one of the agents $6_1$ to $6_n$. Providing news, sports scores or weather updates for the caller location, asking to play a game, asking a music preference, or other form of engagement to occupy the caller 40 during the wait time. Data collected from the entertainment bot may be added to the caller's CRM profile, e.g. programmatically from the Orchestrator 25, so caller choices can be remembered on the next call, e.g. such as choice of music.

Once the Work Engine 24 delivers the voice work item to one of the agents $6_1$ to $6_n$, the replacement of the ACD role is considered complete. The remaining step is to connect the caller 40 to the phone of the selected agent $6_1$ to $6_n$. However, there are a few methods in which the connection may be done: i) A direct inward dialing number (DIDs) may be assigned all agents $6_1$ to $6_n$ servicing external calls from the organizations PBX network; ii) Conference (outbound call from agent); iii) Embedded Voice Engine component; or iv) Orchestrator Driven.

In the first method, DIDs are used, the agent desktop solution 51, such as InGenius Connector Enterprise, may use the Call GUID contained in the work item to request the Voice Engine 22 to transfer the call 3 directly to the DID of the agent $6_1$ to $6_n$. The agent desktop may do this by communicating to the Orchestrator 25, or directly to the Voice Engine 22. The agent desktop solution 51 is different than the orchestrator 25, because, for instance, the InGenius Connector Enterprise product bridges the agent phone system and CRM 12, and provides a UI within the CRM browser webpage (iframe) to make and receive calls, i.e. remote controls the agents phone so they do not have to take their hands off their keyboard or mouse. The agent desktop solution 51 has the ability to contain "custom" code, whereby an API call may be made from the desktop solution 51 to the Orchestrator 25 or the Voice Engine 22 to instruct them to transfer the call 3 to the phone number of the agent $6_1$ to $6_n$.

In a second embodiment, the Work Engine 24 generates a Call GUID for each call, i.e. work item, and the agent desktop solution 51 automatically dials the Voice Engine 22, creates a conference with a selected one of the agents $6_1$ to $6_n$, and instructs the Voice Engine 22 to pull the caller 40 (Call GUID) into the conference.

In a third embodiment, the work item contains a Call GUID and Conference GUID, and the agent desktop solution 51 automatically contacts the Voice Engine 22 and transmits the conference GUID and the call GUID to the selected one of the agents $6_1$ to $6_n$, thereby joining the selected one of the agents $6_1$ to $6_n$ with the caller 40 in the conference. In this method the Voice Engine 22 previously moved the caller 40 into their independent conference session and provide that conference GUID to the Orchestrator 25, such that the conference GUID was included in the voice work item with the call GUID.

In a fourth embodiment, the work item contains a Call GUID and Call Park (slot ID) code, and the agent desktop solution 51 automatically contacts the Voice Engine 22 and provides the slot ID to one of the selected agents $6_1$ to $6_n$, thereby "picking up" the caller 40 and being connected directly. This leverages an existing telephony feature known as Call Park/Pickup. In this method the Voice Engine 22 previously moved the caller 40 into a parking slot and provided the slot ID to the Orchestrator 25, such that the slot ID was included in the voice work item.

In another embodiment, the desktop agent solution 51 contains an embedded voice solution provided by the Voice Engine 22, such that the caller Call GUID and the selected agent $6_1$ to $6_n$ are managed on the same voice platform. An embedded component could leverage the WebRTC standard. While the customer service center may be using a premise based voice solution, such as Cisco, the embedded WebRTC phone could place the agent in a busy phone state (so no calls are received from Cisco) and then instruct the Voice Engine 22 to connect the embedded WebRTC client with the caller Call GUID directly.

In another embodiment, the entire call center is based off a Voice Engine solution, e.g. Twilio or Amazon Connect, and the embedded WebRTC component is the defacto communications method, i.e. no need to juggle the desktop phone agent state as explained above.

Regardless of the embodiment, rather than have the agent desktop application 51 acting on the work item to initiate the connection, the Orchestrator 25 may drive this behavior.

In the preferred embodiment, the Orchestrator 25 creates the voice work item, and maintains a listener for updates to the work item. As the CRM 12 routes the work item through its internal engine, or pushes it to an external engine, the Orchestrator 25 receives events as the item is modified. Such behavior is described by the Salesforce External Routing protocol in interface software 16. Specifically, when the work item is accepted by an agent $6_1$ to $6_n$, the work item is updated to contain the agent identifier to which the work has been assigned, and this update is broadcast to listeners. Upon being notified of agent assignment, the Orchestrator 25 may automatically initiate any of the voice binding embodiments directly. More specifically, the agent identifier may be used to lookup the agents DID, and the Voice Engine 22 may be instructed to transfer the Call GUID to the agent DID. Alternately, the Voice Engine 22 may be instructed to start a conference, move the Call GUID into the conference, and the dial the agent DID to join them into the conference. If an embedded WebRTC solution is in use, the Orchestrator 25 simply instructs the voice engine to join (conference, transfer, park/pickup) the Call GUID and agents WebRTC extension.

While the embodiments described herein are intended to function with the Public Switched Telephone Network (PSTN), this integration is the most complex point of the system, specifically when attempting to bridge a call from the system to the agent telephone. Instead of using the PSTN, several other technologies could be combined with the invention to create more seamless communication. Specifically: WebRTC, now supported by all mobile devices and browsers, could be used from a support web site to enable Voice directly between customers and support centers.

Communication tools that offer APIs for integration, such as WhatsApp, can be supported on the voice to chat bot service.

This system could further be extended by wrapping it as a global support launch pad. A mobile RCS or WebRTC application, HelpMe, could be created to facilitate one click communication from brands to their support centers. These brands would register a support line with the HelpMe cloud service, and customers can then use Siri, Alexa, or Google commands to launch the application. For example, 'Alexa, HelpMe with Rogers cable modem', would create a voice connection between Alexa and Rogers, and preselect cable modem as the starting point for the chat. The chat bot would engage the customer to collect additional information required to satisfy the request else route the caller to an available agent.

The solution can easily be used to provide SMS to chat bot integration as well. While this does not have real-time constraints related to voice and voice routing, it does have the same problems with rendering Web Chat menus and buttons in SMS, and the translation component can be leveraged.

The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A call management system for connecting a caller to one of a plurality of agents via a customer relationship management (CRM) system without a contact center provider automated call distribution (ACD) or integrated voice recognition (IVR), the system comprising:
 a microprocessor; and
 a computer-readable memory encoding instructions that, when executed by the microprocessor, create:
  a voice engine for receiving an audio call from the caller;
  a chat engine capable of providing an automated chat bot for interacting with the caller to collect information and execute predefined tasks;
  an orchestrator capable of:
   converting text messages from the chat bot to audio messages for the caller;
   converting audio messages from the caller into text messages for the chat bot; and
   converting an HTML form in the text messages from the chat bot to an audio message by:
    detecting embedded HTML in the text messages;

parsing the embedded HTML to identify one or more objects by finding key words;
parsing the name of each of the one or more identified objects;
parsing each of the one or more identified objects to obtain one or more nouns;
translating the name of each of the one or more identified objects into one or more verbs;
formulating a text to speech phrase by combining the one or more verbs and the one or more nouns into a sentence; and
converting the phrase to an audio message using text to speech; and
a work engine for connecting the audio call to a selected one of the agents; and
wherein the orchestrator is capable of transferring the caller to the selected agent via the work engine.

2. The system according to claim 1, wherein the orchestrator is also capable of placing the caller in a conference call with other callers on mute; and wherein the orchestrator is also capable of communicating with the caller individually without the other callers hearing.

3. The system according to claim 2, wherein the orchestrator is also capable of placing the selected agent in the conference call with the caller to transfer the audio call to the selected agent.

4. The system according to claim 1, further comprising a connector engine for interfacing between the CRM and the plurality of agents; wherein the orchestrator generates a work item for the connector engine including information relating to the caller.

5. The system according to claim 4, wherein the connector engine is capable of transferring the audio call to a direct inward dialing number of the selected agent.

6. The system according to claim 1, wherein the orchestrator starts recording the caller when one of a predetermined list of words and/or symbols is generated by the chat bot, to ensure entire caller's response is recorded.

7. The system according to claim 1, wherein the orchestrator is configured to continuously record audio messages of the caller, to timestamp questions made by the chat bot, and to convert portions of audio messages to text messages based on the timestamps.

8. The system according to claim 1, wherein the orchestrator is capable of providing the caller with a pre-chat list of questions, and selecting questions for the chat bot based on responses to the questions.

9. The system according to claim 8, wherein the orchestrator is configured to provide the list of questions to the caller one at a time, wait for a response to each question before proceeding to the next question on the list, and providing all of the responses to the chat engine together.

10. The system according to claim 1, wherein the orchestrator is capable of: parsing a count of a number of sub objects; and translating the count to a number.

11. The system according to claim 10, wherein the orchestrator is capable of converting audio responses from the caller into the embedded HTML format for insertion into the chat stream.

12. The system according to claim 1, wherein the orchestrator is also capable of determining when the interaction with the chat bot is completed by either determining the caller requests a transfer to the selected agent or the chat bot is unable to continue the interaction.

13. The system according to claim 1, wherein the chat engine is capable of designating each call a work item, which includes a call unique identifier and the information collected by the chat bot; and further comprising an agent desktop solution capable of communicating with the orchestrator or the voice engine to use the call unique identifier to transfer the call directly to a direct inward dialing number of the selected agent.

14. The system according to claim 1, wherein the chat engine is capable of designating each call a work item, which includes a call unique identifier and the information collected by the chat bot;
wherein the voice engine is capable of moving the call into an independent conference session and generate a conference unique identifier; and providing the conference unique identifier to the orchestrator, such that the conference unique identifier is included in the work item; and
further comprising an agent desktop solution capable of joining the caller with the selected agent in the independent conference via the conference unique identifier.

15. The system according to claim 1, wherein the chat engine is capable of designating each call a work item, including a call unique identifier and the information collected by the chat bot; and
wherein the work engine is capable of inputting the work item into a customer relationship management (CRM) provider;
wherein the CRM is capable of providing the work item to the selected agent, thereby directly connecting the caller and the selected agent.

16. A method of connecting a caller to one of a plurality of agents via a customer relationship management (CRM) system without a contact center provider, comprising:
receiving an audio call from the caller via a voice engine;
providing an automated chat bot for interacting with the caller to collect information and execute predefined tasks via a chat engine;
converting text messages from the chat bot to audio messages for the caller;
converting an HTML form in the text messages from the chat bot to an audio message by;
detecting embedded HTML in the text messages;
parsing the embedded HTML to identify one or more objects by finding key words;
parsing the name of each of the one or more identified objects;
parsing each of the one or more identified objects to obtain one or more nouns;
translating the name of each of the one or more identified objects into one or more verbs;
formulating a text to speech phrase by combining the one or more verbs and the one or more nouns into a sentence; and
converting the phrase to an audio message using text to speech;
converting audio messages from the caller into text messages for the chat bot;
connecting the audio call to a selected one of the agents; and
transferring the caller to the selected agent.

17. The method according to claim 16, further comprising placing the caller in a conference call with other callers on mute; and placing the selected agent in the conference call with the caller to transfer the audio call to the selected agent.

18. The method according to claim 16, further comprising recording the caller when one of a predetermined list of words and/or symbols is generated by the chat bot, to ensure entire caller's response is recorded.

\* \* \* \* \*